United States Patent [19]

Roth

[11] 4,199,492

[45] Apr. 22, 1980

[54] AUTOXIDATIVE PAINT COMPOSITION COMPRISING UNSATURATED POLYETHER AND MALEIC MODIFIED ACRYLIC COPOLYMER

[75] Inventor: Howard T. Roth, Clifton, N.J.

[73] Assignee: Inmont Corporation, New York, N.Y.

[21] Appl. No.: 24,822

[22] Filed: Mar. 29, 1979

[51] Int. Cl.² .................. C08L 33/08; C08L 33/10; C08L 33/12; C08L 57/10
[52] U.S. Cl. .................. 260/32.8 R; 260/31.2 R; 260/33.4 R; 260/42.21; 260/42.43; 525/193; 525/207; 525/74; 525/195
[58] Field of Search ............ 260/901, 32.8 R, 876 R; 525/207, 193, 74

[56] References Cited

U.S. PATENT DOCUMENTS

| | | | |
|---|---|---|---|
| 3,203,915 | 8/1965 | D'Alelio | 260/23.7 |
| 3,420,914 | 1/1969 | May | 260/837 |
| 3,507,821 | 4/1970 | Vasta | 260/31.2 |
| 3,626,027 | 12/1971 | Tanaka et al. | 260/874 |
| 3,689,592 | 9/1972 | Fock et al. | 206/836 |
| 3,770,602 | 11/1973 | D'Alelio | 204/159.15 |

FOREIGN PATENT DOCUMENTS 1578678  7/1969  France ................. 525/57

Primary Examiner—Carman J. Seccuro
Attorney, Agent, or Firm—Michael R. Chipaloski; F. W. Wyman

[57] ABSTRACT

A novel coating composition useful in automobile refinish air-dry paint coating compositions. The novel coating composition comprises a blend of a maleic modified acrylic copolymer and an unsaturated polyether.

7 Claims, No Drawings

AUTOXIDATIVE PAINT COMPOSITION COMPRISING UNSATURATED POLYETHER AND MALEIC MODIFIED ACRYLIC COPOLYMER

BACKGROUND OF THE INVENTION

This invention relates to coating compositions and to such compositions that are useful as topcoat finishes for automobiles. More particularly, this invention relates to a novel binder useful in solvent borne autoxidative coating compositions that have particular utility as refinish paint compositions for automobiles.

The use of organic solvents in compositions useful as auto paint compositions is well known in the art but the drying step usually results in long drying times or the use of heat to evaporate the solvent.

It has also been recognized heretofore that water can be used as a volatile solvent in coating compositions. The use of water as a solvent in coating compositions has many disadvantages, however. Among these disadvantages is the fact that more heat is required to evaporate water than for any of the organic solvents and this results in a necessity to allow more time and/or the use of higher temperatures to evaporate the solvent.

I have now found novel autoxidative organic solvent-containing coating compositions comprising a binder of a blend of a maleic modified acrylic copolymer and an unsaturated polyether that can be air-dried in a short period of time. Such compositions have been found to be particularly useful, when pigmented, in air dry refinish paint compositions for the automotive industry.

SUMMARY OF THE INVENTION

The present invention provides a coating composition comprising a blend of
(1) about 60 to about 80% by weight of a maleic modified acrylic copolymer and
(2) about 20 to about 40% by weight of an unsaturated polyether.

By maleic modified acrylic copolymer useful according to this invention, I mean acrylic and substituted acrylic copolymers which are reacted with maleic anhydride.

The preferred unsaturated polyether compounds comprise a polymer or copolymer formed by polymerizing the glycidyl ether or a β-unsaturated alcohol of at least 3 carbon atoms either alone or with other oxirane compounds.

DETAILED DESCRIPTION OF THE INVENTION

The present invention is directed to novel coating compositions comprising a blend of
(1) about 60 to about 80% by weight of a maleic modified acrylic copolymer and
(2) about 20 to about 40% of an unsaturated polyether.

By acrylic copolymer I mean ethylenically unsaturated monomers that have been copolymerized and include the acrylic and substituted acrylic monomers such as methyl methacrylate, cyclohexyl methacrylate, benzyl methacrylate, methyl, ethyl and butyl acrylate, phenyl acrylate, phenyl methacrylate, alpha-chloroacrylonitrile and the like; acrylic acid and methacrylic acid and the like and hydroxyl functional monomers such as hydroxyethyl acrylate, hydroxypropyl acrylate, hydroxyethyl methacrylate and the like. Any of the known polymerizable acrylic monomers can be used and the compounds listed above are illustrative and not restrictive of the monomers suitable for use in this invention.

The ethylenically unsaturated monomers are first polymerized in hydroxyl free solvents with (0.5–5.0%) peroxide catalyst such as t-butyl peroctoate, t-butyl perbenzoate, ditert-butyl peroxide and the like or with azo compounds like VAZO, etc., and then are preferably post reacted with maleic anhydride to form the half ester.

Preferred compositions are comprised of 10–25% hydroxyl functional monomer, 5–15% maleic anhydride and 60–85% acrylic monomer.

The unsaturated polyether is typically prepared by polymerizing the glycidyl ether of a β-unsaturated alcohol of at least 3 carbon atoms either alone or with other oxirane compounds.

The glycidyl ethers of β-unsaturated alcohols of compounds containing β-ether groups useful according to this invention in the preparation of the unsaturated polyether compounds include allyl glycidyl ether, methallyl glycidyl ether, 2-propynyl glycidyl ether, diglycidyl ether of 2-butyne-1,4-diol, cinnamyl glycidyl ether and crotyl glycidyl ether.

Glycidyl ether compounds containing unsaturation in the β position with respect to an ether linkage may be copolymerized with other glycidyl compounds such as epichlorohydrin, 1-chloro-3,4-epoxybutane, ethylene oxide, propylene oxide, 1,6 hexylene diglycidyl ether, diglycidyl ether of 2,2-bis (4-hydroxy phenyl)-propane, methyl, ethyl, propyl, butyl, 2 ethylhexyl or phenyl glycidyl ether, cyclohexene oxide, and glyceroltriglycidyl ether.

The glycidyl compounds are polymerized using a variety of catalysts, including stannous chloride, caustic alkalies such as sodium hydroxide, boron trifluoride and complexes thereof such as boron trifluoride etherate, zinc chloride, ferric chloride, diethylzinc, antimony pentachloride, alkali metal alkoxides. The resultant unsaturated polyether typically has an average molecular weight from about 300 to about 20,000.

The coating composition is formed by blending from about 60 to about 80% by weight of one or more maleic anhydride modified acrylic copolymers with from about 20 to about 40% by weight of the unsaturated polyether to form a preferred binder composition. Auto paint compositions can then be produced utilizing this binder composition.

In the preparation of a typical paint composition according to this invention, pigments are blended with the binder at a weight percent ratio of from about 5 to about 40% pigment to from about 60 to about 95% of the binder.

Pigments used in the coating composition are those conventionally used in the industry and are selected on the basis of their suitability to produce the desired end result. Typical pigments that are used in automobile finishes are operable, for instance, and include such pigments as phthalocyanine blue, phthalocyanine green, B.O.N. red pigments, quinacridone pigments, Indanthrene Blue, Thio-indigo red, Indo orange and red, benzidene yellow, carbon black, titanium dioxide, iron oxide, Siennas, cadmium red, lead chromate, molybdate orange, metal flake, etc. Transparent dyes, such as rhodamine, Victoria Blue, methyl violet, etc. may also be used.

In a preferred embodiment a low boiling solvent such as methyl ethyl ketone, toluol, xylol, n-butanol, n-propanol, isopropanol, ethyl, propyl, isopropyl and butyl acetate, diethyl or methyl isobutyl ketone, etc., or a combination of solvents, can be used to form the paint composition.

In an especially preferred embodiment of this invention, a small amount of from about 0.05 to about 1.0% by weight of a metallic drier can be added to the paint composition to speed up the drying process. Exemplary of the metallic driers useful according to this invention include the metal salts or organic acids wherein such salts are soluble in the paint composition. Especially preferred metals are cobalt, lead, copper, manganese and zinc; and the acids are selected from naphthenic, 2-ethyl hexoic and neodecanoic.

DESCRIPTION OF THE PREFERRED EMBODIMENTS

The following examples are given to further illustrate the invention:

EXAMPLE I

Preparation of Maleic Modified Acrylic Copolymer

|  |  | Grams |  |  | Grams |
|---|---|---|---|---|---|
| 1. | Xylol | 372 | 3. | Methyl Methacrylate | 408 |
| 2. | Methyl Cellosolve Acetate | 240 | 4. | Butyl Methacrylate | 96 |
|  |  |  | 5. | Hydroxy Ethyl Methacrylate | 96 |
| 7. | Methyl Cellosolve Acetate | 3 |  |  |  |
| 8. | t-Butyl Perbenzoate | 3 | 6. | t-Butyl Perbenzoate | 12 |
| 9. | Methyl Cellosolve Acetate | 3 |  |  |  |
| 10. | t-Butyl Perbenzoate | 3 | 11. | Maleic Anhydride | 58.8 |

1 and 2 were heated under nitrogen and reflux conditions to 135° C. and then the 3-6 mixture added dropwise in approximately 2½ hours at 130°-135° C. The batch was held at a temperature of 130°-135° C. for 1½ hours after which 7+8 and 9+10 were added at 1 hour intervals. The maleic anhydride (11) was then added and the batch held 1 hour at a temperature of 135° C. The vehicle had a TNV of 52% and a Brookfield viscosity at 25° C. of 17.3 poise.

EXAMPLE II

Preparation of Poly-Allyl Glycidyl Ether

|  |  | Grams |
|---|---|---|
| 1. | Allyl Glycidyl Ether | 1000 |
| 2. | Dioxane | 60 |
| 3. | 99% Glycerine | 6 |
| 4. | BF$_3$Etherate | 12 |

1 was heated under nitrogen and reflux conditions to 105° C. 2-4 mix was added dropwise at 100°-120° C. in approximately 1½ hours, and cooled to control exotherm. After addition was complete, the reaction was held 4 hours at 110°-115° C., then vacuum stripped at 10-15 mm and 110° C. Yield 1000 grams, Brookfield viscoisty at 25° C.=3 poise and an Iodine Value of 205.

The following examples relate to the preparation of a typical paint composition utilizing the binders of the present invention.

EXAMPLE III

Preparation of White Paste

|  |  | Grams |
|---|---|---|
| 1. | Acrylic Copolymer of Example I | 262.5 |
| 2. | p-Allyl Glycidyl Ether of Example II | 58.5 |
| 3. | TiO$_2$ Color Paste | 105.0 |
| 4. | Methyl Ethyl Ketone | 74.0 |

The four components were ball milled 18 hours overnight. The resultant color dispersion had the following characteristics: 60% TNV; 35/65 Pigment:Binder Ratio; 70/30 Ratio Acrylic:p-Allyl Glycidyl Ether; Viscosity #2 Zahn cup=33.5 seconds.

EXAMPLE IV

Preparation of Phthalo Blue Paste

|  |  | Grams |
|---|---|---|
| 1. | Acrylic copolymer of Example I | 154.8 |
| 2. | p-Allyl Glycidyl Ether of Example II | 34.5 |
| 3. | Phthalo Blue | 10.0 |
| 4. | Methyl Ethyl Ketone | 50.7 |

The four components were ball milled 18 hours overnight. The resultant color dispersion had the following characteristics: 50% TNV; 8/92 Pigment:Binder Ratio; 70:30 Ratio Acrylic:p-Allyl Glycidyl Ether; Viscosity #2 Zahn cup-41 seconds.

EXAMPLE V

Preparation of Light Blue Paint

|  |  | Grams |
|---|---|---|
| 1. | Acrylic Copolymer of Example I | 154.80 |
| 2. | p-Allyl Glycidyl Ether of Example II | 34.50 |
| 3. | 60% TiO$_2$ Paste of Example III | 113.10 |
| 4. | 50% Phthalo Blue Paste of Example IV | 31.25 |
| 5. | Methyl Ethyl Ketone | 7.30 |
| 6. | Toluol | 7.30 |
| 7. | 6% Cobalt Naphthenate | 1.95 |

The ingredients were mixed in the order listed using a Hamilton-Beach mixer and the resultant paint composition had the following characteristics: 30/70 Pigment:Binder Ratio; 70/30 Ratio Acrylic:p-Allyl Glycidyl Ether; 0.2% Cobalt as Metal on Resin Solids; TNV=15.54% Pigment+36.34% Binder; Viscosity at 22° C. #2 Zahn cup=23 seconds. When coated on a metallic surface the paint composition air-dried in 2½-3 hours to a smooth, durable finish.

EXAMPLE VI

Preparation of Aluminum Paint

| 1. | Acrylic Copolymer of Example 1 | 134.62 |
|---|---|---|
| 2. | p-Allyl Glycidyl Ether of Example II | 30.00 |
| 3. | Toluol | 30.00 |
| 4. | Butyl Alcohol | 2.00 |
| 5. | Aluminum Paste | 11.90 |
| 5. | 12% Cobalt Neodecanoic Acid Salt | 0.83 |
| 6. | Reducer (Solvent Blend) | 64.50 |

Prepared in the same manner as Example V. The resultant paint composition had the following characteristics: 7/93 Pigment:Binder Ratio; 70/30 Acrylic:p-Allyl Glycidyl Ether; 0.10% Cobalt as Metal on Resin Solids; TNV=2.73% pigment+39.24% binder; Viscosity at 25° C. #2 Zahn cup=23 seconds. When coated on a metallic surface, the paint dried in 3 hours to a smooth, durable finish.

I claim:

1. A coating composition comprising a blend of
   (a) about 60 to about 80% by weight of a maleic modified acrylic copolymer and
   (b) about 20 to about 40% by weight of an unsaturated polyether.

2. The coating composition of claim 1 wherein the maleic modified acrylic copolymer comprises 10–25% hydroxyl functional acrylic monomer, 5–15% maleic anhydride and 60–85% acrylic monomer.

3. The coating composition of claim 1 wherein the unsaturated polyether is prepared from a glycidyl ether compound selected from the group consisting of allyl glycidyl ether, methallyl glycidyl ether, 2-propynyl glycidyl ether, the diglycidyl ether of 2-butyne-1,4-diol, cinnamyl glycidyl ether and crotyl glycidyl ether.

4. The coating composition of claim 1 wherein the composition contains a low boiling solvent.

5. An automobile paint composition of from about 60 to about 95% of a binder comprising a blend of
   (a) about 60 to about 80% by weight of a maleic modified acrylic copolymer and
   (b) about 20 to about 40% by weight of an unsaturated polyether
and from about 5 to about 40% pigment.

6. The paint composition according to claim 5 wherein the composition contains low boiling solvent.

7. The paint composition according to claim 5 wherein the composition contains from about 0.05 to about 1.0% metallic drier.